(12) United States Patent
Kobayashi et al.

(10) Patent No.: US 10,118,813 B2
(45) Date of Patent: Nov. 6, 2018

(54) CONNECTOR AND SOCKET

(71) Applicant: Surpass Industry Co., Ltd., Gyoda-shi, Saitama (JP)

(72) Inventors: Masamichi Kobayashi, Saitama (JP); Masahiro Hasunuma, Saitama (JP)

(73) Assignee: SURPASS INDUSTRY CO., LTD., Saitama (JP)

( * ) Notice: Subject to any disclaimer, the term of this patent is extended or adjusted under 35 U.S.C. 154(b) by 0 days.

(21) Appl. No.: 15/630,541

(22) Filed: Jun. 22, 2017

(65) Prior Publication Data

US 2017/0369299 A1 Dec. 28, 2017

(30) Foreign Application Priority Data

Jun. 23, 2016 (JP) ................................. 2016-124484

(51) Int. Cl.
| | |
|---|---|
| *B67D 7/02* | (2010.01) |
| *F16K 11/08* | (2006.01) |
| *F16K 31/60* | (2006.01) |
| *F16L 37/084* | (2006.01) |
| *F16K 35/02* | (2006.01) |
| *F16K 1/30* | (2006.01) |
| *F16K 11/085* | (2006.01) |

(52) U.S. Cl.
CPC ............ *B67D 7/0294* (2013.01); *F16K 1/304* (2013.01); *F16K 1/308* (2013.01); *F16K 11/08* (2013.01); *F16K 11/0856* (2013.01); *F16K 31/602* (2013.01); *F16K 35/02* (2013.01); *F16L 37/084* (2013.01)

(58) Field of Classification Search
CPC ... B67D 7/0294; F16K 11/0856; F16K 1/308; F16K 1/304; F16K 35/02; F16K 11/08; F16K 31/602; F16L 37/084
See application file for complete search history.

(56) References Cited

U.S. PATENT DOCUMENTS 4,291,821 A * 9/1981 Nezworski ........... B67D 1/0832
137/212
5,875,921 A * 3/1999 Osgar ...................... B67D 7/02
222/1

(Continued)

FOREIGN PATENT DOCUMENTS

| EP | 0927849 A2 | 7/1999 |
| JP | H11-193894 A | 7/1999 |

(Continued)

OTHER PUBLICATIONS

Extended European Search Report dated Nov. 6, 2017 in corresponding European Application No. 17176814.6, 8 pages.

*Primary Examiner* — Donnell Long
(74) *Attorney, Agent, or Firm* — MH2 Technology Law Group, LLP (57) ABSTRACT

Provided is a connector including a plug and a socket. The socket includes: a socket body in which a second liquid outflow passage and a second liquid inflow passage are formed; a ball lock mechanism that is attached to the socket body and fixes the socket body to a key ring; and a switching mechanism that switches an open state and a closed state of a rotary valve. The switching mechanism includes an opening/closing arm that regulates releasing of the fixation of the socket body to the key ring by the ball lock mechanism in the open state.

7 Claims, 10 Drawing Sheets

(56) References Cited

U.S. PATENT DOCUMENTS

| | | | |
|---|---|---|---|
| 5,971,019 A | 10/1999 | Imai | |
| 6,015,068 A * | 1/2000 | Osgar | B01J 4/00 222/105 |
| 8,464,499 B2 * | 6/2013 | Asp | B65C 7/00 235/375 |
| 2006/0225812 A1 * | 10/2006 | Hennen | B65D 51/1683 141/367 |
| 2009/0188919 A1 | 7/2009 | Takanohashi | |
| 2011/0309114 A1 | 12/2011 | Chen | |
| 2012/0037625 A1 | 2/2012 | Hasunuma et al. | |
| 2015/0298960 A1 | 10/2015 | Hennen | |

FOREIGN PATENT DOCUMENTS

| | | |
|---|---|---|
| JP | 2009-173326 A | 8/2009 |
| WO | 03/045834 A1 | 6/2003 |
| WO | 2014/085701 | 6/2014 |

* cited by examiner

CONNECTOR AND SOCKET

CROSS-REFERENCE TO RELATED APPLICATIONS

This application is based on Japanese Patent Application No. 2016-124484, the contents of which are incorporated herein by reference in its entirety.

TECHNICAL FIELD

The present invention relates to a connector and a socket.

BACKGROUND ART

Heretofore, a plug and a socket which are attached to a liquid storing container for storing a drug solution or the like used for semiconductor production have been known (for example, see Japanese Unexamined Patent Application, Publication No. 2009-173326 (hereinafter referred to as "JP2009-173326")).

In the plug and the socket disclosed in JP2009-173326, the inside of a container is pressurized with a gas supplied from a gas supply pipe to the socket and a liquid contained in the container is guided to an external line via a siphon tube, the plug, and the socket. The socket disclosed in JP2009-173326 is fixed to an inlet of the container by fastening an internal thread which is provided in a sleeve into an external thread which is formed at the inlet of the container.

SUMMARY

Technical Problem

However, the socket disclosed in JP2009-173326 does not include a switching mechanism for opening or closing a liquid return passage formed in the socket. Accordingly, when the socket is detached from the plug, the liquid remaining in the liquid return passage flows to the outside.

Even if the socket disclosed in JP2009-173326 is provided with the switching mechanism, once the fixation of the socket to the inlet of the container is released in the open state, the liquid remaining in the liquid return passage flows to the outside.

The present disclosure has been made in view of the above-mentioned circumstances, and an object of the present disclosure is to provide a connector and a socket which prevent a failure that a liquid flows to the outside when the socket is detached from a plug.

Solution to Problem

To solve the above-mentioned problem, the present disclosure provides the following solutions.

A connector according to a first aspect of the present disclosure is a connector to be attached to an opening of a liquid storing container, the connector including: a plug to be attached to the opening; and a socket to be detachably attached to the plug. The plug includes: a plug body in which a first liquid outflow passage through which a liquid contained in the liquid storing container is drawn out and a first liquid inflow passage for guiding the liquid flowing in from an outside of the liquid storing container into the liquid storing container are formed. The socket includes: a socket body in which a second liquid outflow passage through which the liquid drawn out from the first liquid outflow passage flows to the outside and a second liquid inflow passage for guiding the liquid flowing in from the outside of the liquid storing container to the first liquid inflow passage are formed; a lock mechanism that is attached to the socket body and fixes the socket body to the opening; and a switching mechanism that switches an open state and a closed state, the open state being a state in which the first liquid outflow passage and the second liquid outflow passage communicate with each other and the first liquid inflow passage and the second liquid inflow passage communicate with each other, and the closed state being a state in which the first liquid outflow passage and the second liquid outflow passage do not communicate with each other and the first liquid inflow passage and the second liquid inflow passage do not communicate with each other. The switching mechanism includes a regulating member that regulates releasing of the fixation of the socket body to the opening by the lock mechanism in the open state.

In the connector according to the first aspect of the present disclosure, the liquid is sucked by an external pump in the state where the plug is attached to the opening of the liquid storing container and the socket is attached to the plug, so that the liquid drawn out from the first liquid outflow passage of the plug flows to the outside via the second liquid outflow passage of the socket. The liquid circulated by the external pump is guided into the liquid storing container from the first liquid inflow passage of the plug via the second liquid inflow passage of the socket. Thus, the connector according to the first aspect of the present disclosure has a structure that allows the liquid contained in the liquid storing container to flow to the outside and allows the liquid which has flown to the outside and circulated to flow into the liquid storing container.

Further, in the connector according to the first aspect of the present disclosure, the open state that enables outflow and inflow of the liquid and the closed state that interrupts outflow and inflow of the liquid are switched by the switching mechanism. Accordingly, when the closed state is maintained by the switching mechanism, a failure that the liquid flows to the outside when the socket is detached from the plug can be prevented.

Further, in the connector according to the first aspect of the present disclosure, in the open state of the switching mechanism, the regulating member regulates releasing of the fixation of the socket body to the opening. Accordingly, the fixation of the socket body to the opening in the open state is prevented from being released, and thus a failure that the liquid flows to the outside when the socket is detached from the plug can be prevented.

In the connector according to the first aspect of the present disclosure, the socket may include a regulating mechanism that regulates switching from the closed state to the open state by the switching mechanism. With this structure, for example, when the fixation of the socket body to the opening of the liquid storing container is released, a failure that the switching mechanism is unintentionally switched from the closed state to the open state can be prevented.

The connector having a structure as described above may have a mode in which the switching mechanism includes a releasing mechanism that accepts an operation by an operator and releases a regulated state in which switching from the closed state to the open state by the regulating mechanism is regulated.

With this structure, the regulated state of the switching mechanism can be released only when the user's operation for switching the closed state to the open state is accepted.

The connector having a mode as described above may have a structure in which: the opening is formed into a cylindrical shape about a first axial line; the socket body has a cylindrical insertion hole formed along a second axial line intersecting with the first axial line so as to penetrate through each of the second liquid outflow passage and the second liquid inflow passage; the socket includes a columnar rotary valve including an outflow through-hole formed at a position where the second liquid outflow passage is disposed on the second axial line and an inflow through-hole formed at a position where the second liquid inflow passage is disposed on the second axial line, the rotary valve being inserted into the insertion hole; the regulating mechanism includes a shaft-like member extending along the first axial line, and an urging member that urges the shaft-like member against the switching mechanism; the switching mechanism switches the open state and the closed state by rotating the rotary valve about the second axial line and includes an accommodation hole that accommodates the shaft member and regulates the rotation of the rotary valve in the closed state; and the releasing mechanism releases the regulated state by urging the shaft-like member accommodated in the accommodation hole in a direction opposing an urging force generated by the urging member.

According to the connector described above, the switching mechanism switches the open state and the closed state by rotating the columnar rotary valve inserted into the cylindrical insertion hole of the socket body.

The shaft-like member urged against the switching mechanism by the urging member is accommodated in the accommodation hole, which is included in the switching mechanism, in the closed state. This prevents a failure that the rotary valve is rotated by an unintentional operation or the like and the closed state is switched to the open state.

Further, when the operator's operation is accepted and the shaft-like member accommodated in the accommodation hole is urged against the lock mechanism, the regulated state of the switching mechanism is released. Consequently, the regulated state of the switching mechanism can be released only when the operator's operation for switching the closed state to the open state is accepted.

In the connected described above, the switching mechanism may include a concave portion that accommodates a leading end of the shaft-like member without regulating the rotation of the rotary valve in the open state.

This structure enables the operator to operate the switching mechanism and recognize that the rotary valve is brought into the open state, by a vibration or sound generated when the leading end of the shaft-like member is accommodated in the concave portion. Therefore, it is possible to prevent a failure that the operator excessively rotates the switching mechanism, without recognizing that the rotary valve is in the open state.

The connector according to the first aspect of the present disclosure may have a structure in which: the opening is formed into a cylindrical shape about a first axial line and an engagement groove is formed in an outer peripheral surface along a circumferential direction about the first axial line; and the lock mechanism includes: a plurality of lock balls to be engaged with the engagement groove; a first cylindrical member formed into a cylindrical shape about the first axial line and including a plurality of opening holes having a diameter smaller than an outer diameter of each of the lock balls; a second cylindrical member formed into a cylindrical shape about the first axial line and including a regulating portion that is disposed on an outer periphery of the first cylindrical member, the regulating portion being configured to regulate the lock balls accommodated in the opening holes to be in a state where the lock balls are engaged with the engagement groove; and an urging force generation portion having one end along the first axial line that is fixed to the first cylindrical member, and having another end along the first axial line that is fixed to the second cylindrical member, the urging force generation portion being configured to urge the second cylindrical member against a position where the regulating portion is in contact with the lock balls.

According to the connector having a structure as described above, when the socket is attached to the opening of the liquid storing container to which the plug is fixed, the operator presses the socket into the plug without touching the second cylindrical member, thereby allowing the lock balls to evacuate. This is because a force generated by pressing the socket by the operator becomes a force opposing the urging force of the urging force generation portion, which allows the second cylindrical member to move so that the lock balls can evacuate.

Further, the operator presses the socket into the plug until the lock balls reach the position of the engagement groove, thereby allowing the lock balls to be fixed to the engagement groove by the urging force of the urging force generation portion. Thus, the operator can cause the socket to be fixed to the outer peripheral surface, without the need for any troublesome operation.

A socket according to a second aspect of the present disclosure is a socket to be detachably attached to a plug to be attached to an opening of a liquid storing container, the plug including a plug body in which a first liquid outflow passage through which a liquid contained in the liquid storing container is drawn out and a first liquid inflow passage for guiding the liquid flowing in from an outside of the liquid storing container into the liquid storing container are formed, the socket including: a socket body in which a second liquid outflow passage through which the liquid is drawn out from the first liquid outflow passage flows to the outside and a second liquid inflow passage for guiding the liquid flowing in from the outside of the liquid storing container into the first liquid inflow passage are formed; a lock mechanism that is attached to the socket body and fixes the socket body to the opening; and a switching mechanism that switches an open state and a closed state, the open state being a state in which the first liquid outflow passage and the second liquid outflow passage communicate with each other and the first liquid inflow passage and the second liquid inflow passage communicate with each other, the closed state being a state in which the first liquid outflow passage and the second liquid outflow passage do not communicate with each other and the first liquid inflow passage and the second liquid inflow passage do not communicate with each other. The switching mechanism includes a regulating member that regulates releasing of the fixation of the socket body to the opening by the lock mechanism in the open state.

In the socket according to the second aspect of the present disclosure, like in the connector described above, the open state that enables outflow and inflow of the liquid and the closed state that interrupts outflow and inflow of the liquid are switched by the switching mechanism. Accordingly, when the closed state is maintained by the switching mechanism, a failure that the liquid flows to the outside when the socket is detached from the plug can be prevented.

Further, in the socket according to the second aspect of the present disclosure, in the open state of the switching mechanism, the regulating member regulates releasing of the fixation of the socket body to the opening. Therefore, the fixation of the socket body to the opening in the open state is prevented from being released, and thus a failure that the liquid flows to the outside when the socket is detached from the plug can be prevented.

Advantageous Effects

According to the present disclosure, it is possible to provide a connector and a socket which prevent a failure that a liquid flows to the outside when the socket is detached from a plug.

DESCRIPTION OF EMBODIMENTS

A liquid supply system according to an embodiment of the present disclosure will be described below with reference to the drawings.

Figure 1:
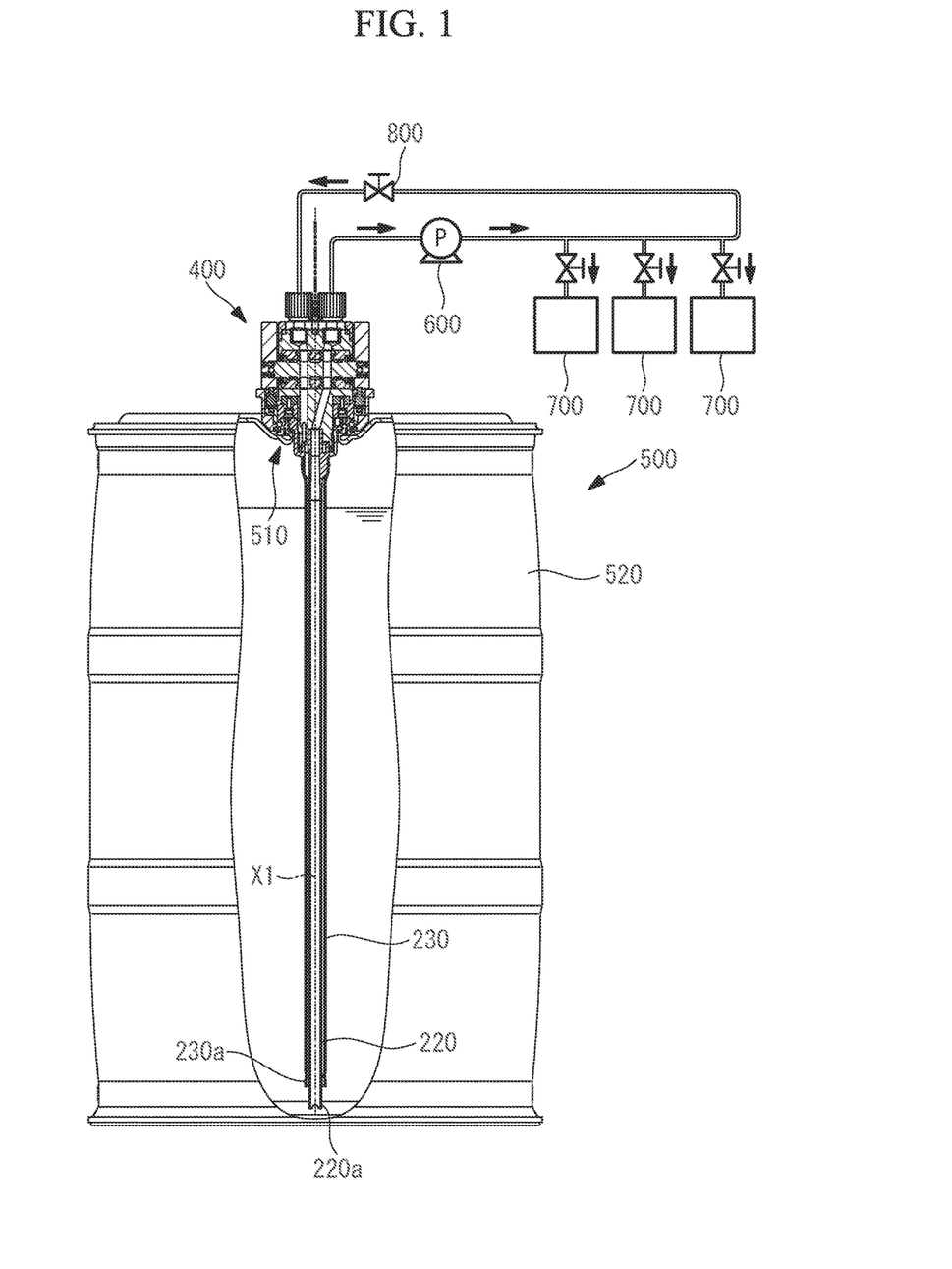
FIG. 1 is a block diagram showing a liquid supply system according to an embodiment of the present disclosure.

A liquid supply system according to this embodiment shown in FIG. 1 is a system in which a liquid contained in a liquid storing container 500 is sucked by a pump 600 and is supplied to a plurality of supply destination devices 700.

The amount of supply of the liquid to each supply destination device 700 is adjusted by a flow rate regulating valve provided on the supply destination device 700. The remaining liquid that is sucked by the pump 600 and is not supplied to each supply destination device 700 is returned to the liquid storing container 500 again via a circulating amount regulating valve 800.

In this manner, the liquid supply system according to this embodiment has a structure in which part of the liquid drawn out from the liquid storing container 500 is supplied to each supply destination device 700 and the remaining liquid is returned to each liquid storing container 500 again for circulation. This structure is intended to prevent solid particles from settling at the bottom of the liquid storing container 500, because the liquid contained in the liquid storing container 500 is a slurry in which solid particles are dispersed, and it is intended to prevent solid particles from settling at the bottom of the liquid storing container.

Note that the flow rate of the liquid to be circulated by the liquid supply system is adjusted by the aperture of the circulating amount regulating valve 800.

The slurry used as the liquid in this embodiment is, for example, a liquid containing a silica-based or seria-based polishing agent used for chemical mechanical polishing which is a wafer polishing method to be employed during semiconductor production.

As shown in FIG. 1, the liquid storing container 500 included in the liquid supply system according to this embodiment includes a container body 520 which contains a liquid, and an opening 510 which is provided in an upper surface (top board) of the container body 520 and is formed into a cylindrical shape about an axial line X1 (first axial line).

As shown in FIG. 1, the liquid supply system according to this embodiment includes a connector 400 to be attached to the opening 510 of the liquid storing container 500. The connector 400 is a device including a liquid outflow passage for causing the liquid contained in the liquid storing container 500 to be drawn out and fed to the pump 600; a liquid inflow passage for causing the liquid passing through the circulating amount regulating valve 800 to be returned to the liquid storing container 500; and a gas passage for introducing an outside air corresponding to the decreased amount of liquid from the liquid storing container 500. According to the connector 400 of this embodiment, outflow of the liquid, inflow of the liquid, and replacement of the outside air corresponding to the decreased amount of liquid can be achieved by one device attached to the opening 510 disposed at one section.

The connector 400 according to this embodiment will be described below with reference to the drawings.

Figure 2:
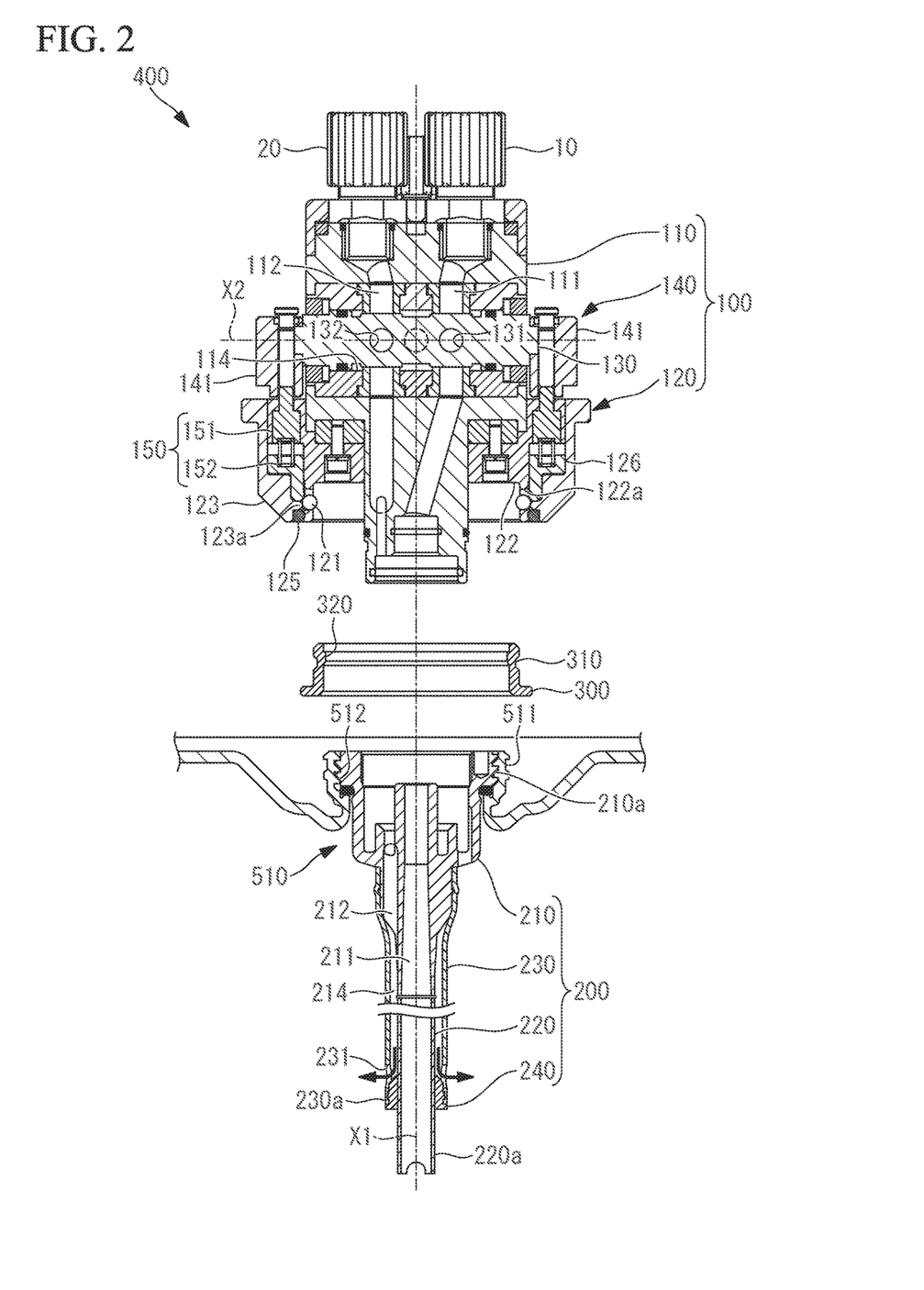
FIG. 2 is a partial longitudinal sectional view of a connector in a state where a socket is spaced apart from a plug and a key ring is spaced apart from an opening as viewed from the front side.
Figure 3:
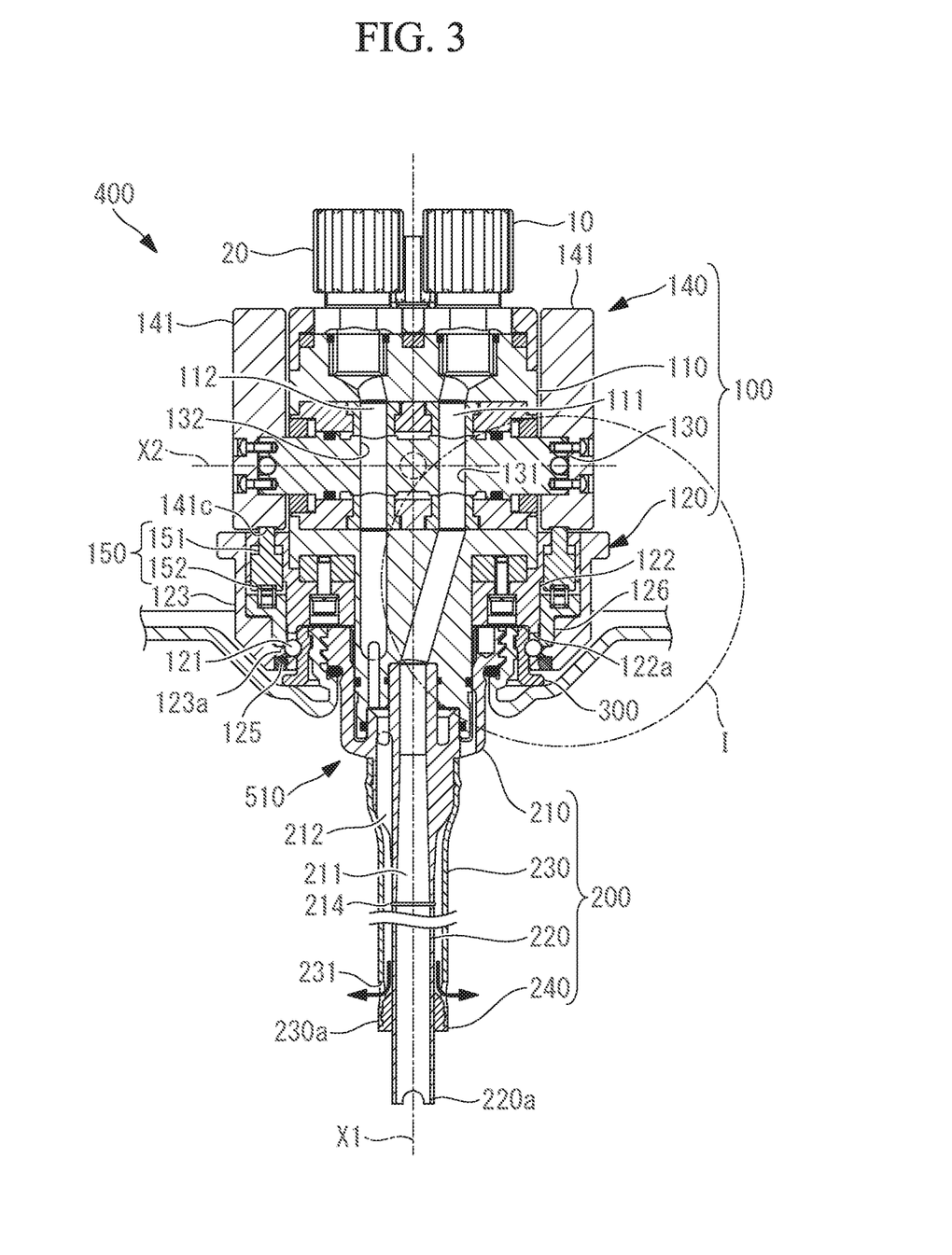
FIG. 3 is a partial longitudinal sectional view of the connector in a state where the socket is attached to the plug and the key ring is attached to the opening as viewed from the front side.

As shown in FIGS. 2 and 3, the connector 400 according to this embodiment includes a plug 200 to be fixed to a female screw 512 which is formed at the inner peripheral surface of the opening 510 formed in the upper surface of the liquid storing container 500; a key ring (opening) 300 to be attached to the outer peripheral surface of the opening 510; and a socket 100 to be detachably attached to the plug 200.

FIG. 2 is a longitudinal sectional view of the connector 400 in a state where the socket 100 is spaced apart from the plug 200 and the key ring 300 is spaced apart from the opening 510. FIG. 3 shows a state where the socket 100 is attached to the plug 200 and the key ring 300 is attached to the opening 510.

As shown in FIG. 2, the key ring 300 is a member which is made of a resin material and formed into a cylindrical shape extending along the axial line X1. The key ring 300 is a member including an endless engagement groove 310 which extends about the axial line X1 and is formed at the outer peripheral surface, and an endless engagement projection 320 which extends about the axial line X1 and is formed at the outer peripheral surface. The inner diameter of the engagement projection 320 is smaller than the outer diameter of the opening 510 of the liquid storing container 500. The inner diameter of the engagement projection 320 substantially equal to the outer diameter of an engagement groove 511 which is formed in the opening 510.

The key ring 300, which is made of a resin material, is pressed against the opening 510 by a jig (not shown), thereby elastically deforming the key ring 300. As a result, the engagement projection 320 formed on the inner peripheral surface of the key ring 300 is engaged with the engagement groove 511 formed in the outer peripheral surface of the opening 510, thereby allowing the key ring 300 to be fixed to the opening 510.

Figure 4:
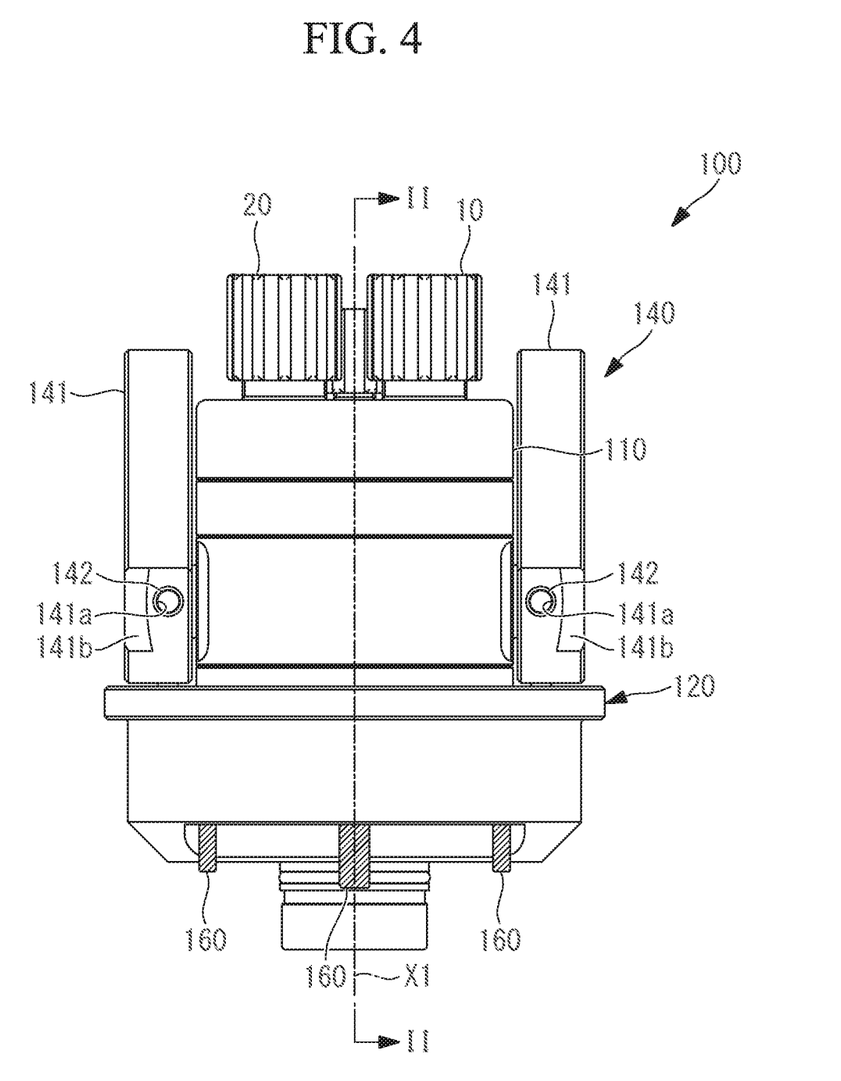
FIG. 4 is a front view of the socket shown in FIG. 3.

The key ring 300 includes a plurality of key holes 330 (see FIG. 5) in which a plurality of key rods 160 included in the socket shown in FIG. 4 are respectively accommodated.

When the positions of the plurality of the key rods 160 included in the socket 100 do not match the positions of the key holes in which the key rods are respectively accommodated, the socket 100 cannot be fixed to the key ring 300. This makes it possible to prevent an improper connection in which the socket 100 is attached to the opening 510 of the liquid storing container 500 to which an improper key ring 300 is attached.

The plug 200 included in the connector 400 according to this embodiment will be described.

As shown in FIG. 2, the plug 200 includes a plug body 210; an inside pipe 220 which is attached to a lower position of the plug body 210 and is formed into a cylindrical shape about the axial line X1; an outside pipe 230 which is attached to the plug body 210 and has a cylindrical shape; and a sealing member 240 for sealing the space between the outside pipe 230 and the inside pipe 220.

Each member constituting the plug 200 is formed of a fluorine-contained resin material, such as PFA (tetrafluoroethylene-perfluoroalkyl vinyl ether copolymer), or a crystalline thermoplastic resin such as HDPE (high-density polyethylene).

The plug body 210 is a member which is formed into a substantially cylindrical shape about the axial line X1 and includes a male screw 210a that is formed at the outer peripheral surface of an upper end thereof. The male screw 210a of the plug body 210 is fastened to the female screw 512 formed at the inner peripheral surface of the opening 510, thereby allowing the plug body 210 to be fixed to the inner peripheral surface of the opening 510.

In the plug body 210, a first liquid outflow passage 211 and a first liquid inflow passage 212 are formed.

The first liquid outflow passage 211 is a passage for causing the liquid contained in the liquid storing container 500 to be drawn out and guided to an outflow port 10. The first liquid inflow passage 212 is a passage for guiding the liquid flowing in from the outside of the liquid storing container 500 via an inflow port 20 into the liquid storing container 500.

The inside pipe 220 is a member formed into a cylindrical shape along the axial line X1. As shown in FIG. 1, a lower end 220a of the inside pipe 220 is disposed near the bottom of the liquid storing container 500 in a state where the plug 200 is attached to the opening 510 of the liquid storing container 500.

The inside pipe 220 is attached to a lower end of the plug body 210 by thermal welding and guides the liquid contained in the liquid storing container 500 to the first liquid outflow passage 211 of the plug body 210.

The outside pipe 230 is a member formed into a cylindrical shape along the axial line X1. As shown in FIGS. 1 and 2, a lower end 230a of the outside pipe 230 is disposed at an upper position of the lower end 220a of the inside pipe 220 in a state where the plug 200 is attached to the opening 510 of the liquid storing container 500.

The outside pipe 230 is attached to the outer peripheral surface at a lower position of the plug body 210 by press fitting and is disposed outside of the inside pipe 220. Between the inner peripheral surface of the outside pipe 230 and the outer peripheral surface of the inside pipe 220, an annular passage 214 for guiding the liquid to be guided to the first liquid inflow passage 212 of the plug body 210 into the liquid storing container 500 is formed.

At the lower end 230a of the outside pipe 230, a plurality of outflow holes 231 through which the liquid is caused to flow out of the annular passage 214 into the liquid storing container 500 are formed at a plurality of sections (for example, four sections at an interval of 90°) about the axial line X1.

The sealing member 240 is a member for sealing the space between the inner peripheral surface of the lower end 230a of the outside pipe 230 and the outer peripheral surface of the inside pipe 220. The sealing member 240 prevents the liquid flowing in from the annular passage 214 from being directly guided to the bottom surface of the liquid storing container 500 along the axial line X1. Since the lower end of the annular passage 214 is sealed by the sealing member 240, the liquid which has reached the lower end of the annular passage 214 flows out into the liquid storing container 500 through the outflow holes 231 as indicated by arrows shown in FIG. 2.

The liquid falling from the upper position to the lower position along the annular passage 214 flows out horizontally (in a direction perpendicular to the axial line X1) from the plurality of outflow holes 231. Accordingly, the liquid flows out in a plurality of directions in which the plurality of outflow holes 231 are opened, so that the liquid in the vicinity of the bottom surface of the liquid storing container 500 flows favorably. Accordingly, when the liquid is a slurry containing a polishing agent or the like (a slurry in which solid particles are dispersed), the state in which the solid particles and the liquid are favorably mixed in the vicinity of the bottom surface of the liquid storing container 500 is maintained.

In the above description, the plurality of outflow holes 231 are formed at the lower end 230a of the outside pipe 230. Alternatively, a single outflow hole 231 may be formed at the lower end 230a of the outside pipe 230.

The socket 100 included in the connector 400 according to this embodiment will be described below.

As shown in FIG. 2, the socket 100 includes a socket body 110, a ball lock mechanism 120, which is attached to the socket body 110, a columnar rotary valve 130, which is inserted into a cylindrical insert hole 114 formed in the socket body 110, a switching mechanism 140 that rotates the rotary valve 130 about an axial line X2 (second axial line), and a regulating mechanism 150 that regulates switching from a closed state to an opened state by the switching mechanism 140.

As shown in FIG. 3, the socket 100 is fixed to the key ring 300, which is attached to the outer peripheral surface of the opening 510 of the liquid storing container 500, by the ball lock mechanism 120 in a state where a lower end of the socket body 110 is inserted into the plug body 210.

In the socket body 110, a second liquid outflow passage 111 and a second liquid inflow passage 112 are formed. The second liquid outflow passage 111 is a passage that causes the liquid to be drawn out from the first liquid outflow passage 211 via the discharge port 10 to flow to the outside. The second liquid inflow passage 112 is a passage that guides the liquid flowing in from the outside of the liquid storing container 500 via the inflow port 20 to the first liquid inflow passage 212.

The ball lock mechanism 120 is a mechanism that causes a plurality of lock balls 121 to be engaged with an engagement groove 310, which is formed along the circumferential direction about the axial line X1 of the key ring 300, and then fixes the plurality of lock balls 121 to the engagement groove 310. The state where the socket 100 and the plug 200 are coupled is maintained by fixing the socket body 110 to the key ring 300 by using the ball lock mechanism 120.

As shown in FIG. 2, the ball lock mechanism 120 includes a plurality of lock balls 121, a socket member (first cylindrical member) 122, a sleeve (second cylindrical member) 123, a spring (urging force generation portion) 124, a stop ring 125, and a spring receiving member 126.

Figure 5:
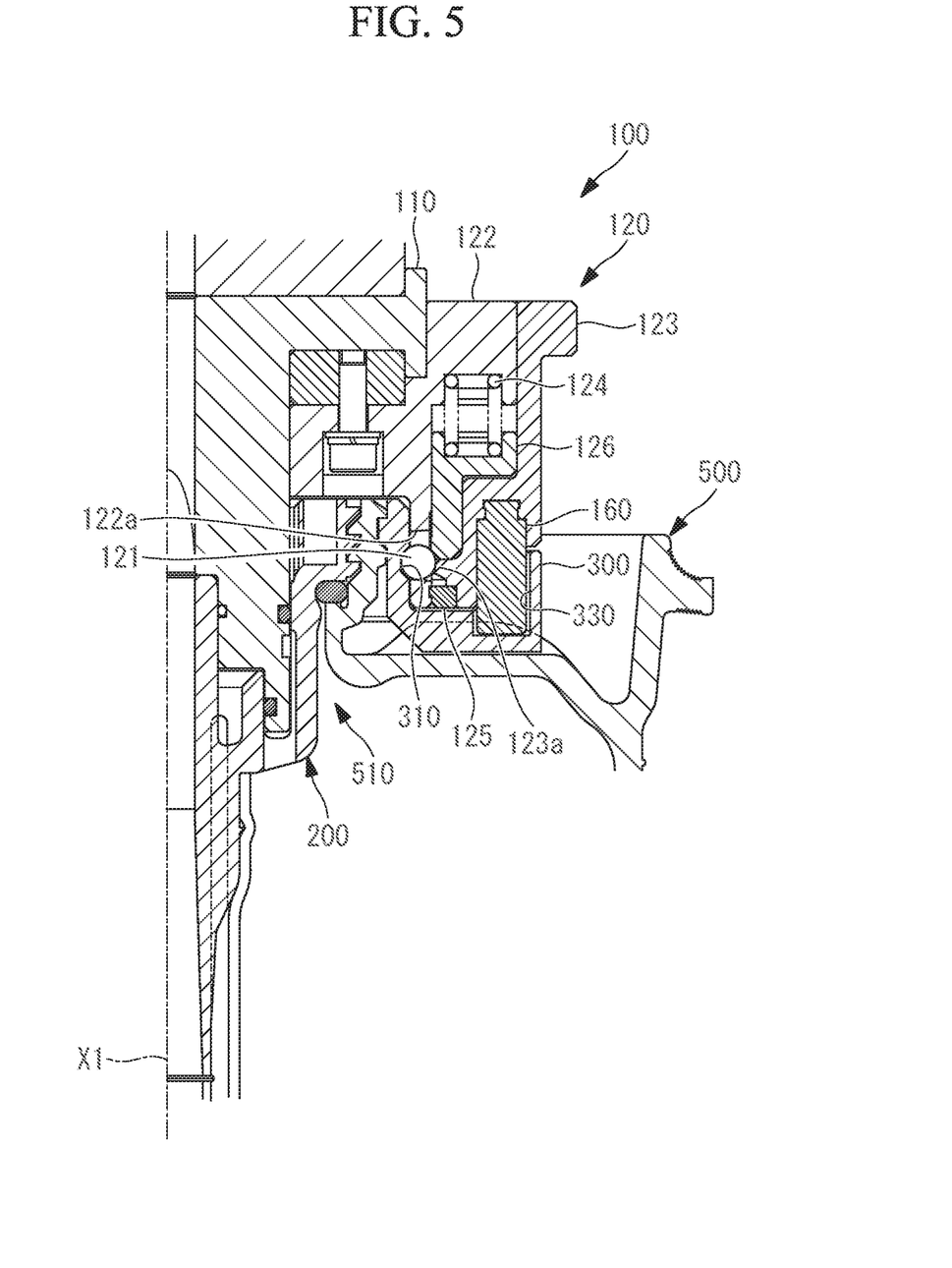
FIG. 5 is a sectional view taken along a line II-II of the socket shown in FIG. 4.

The socket member 122 is a member including a plurality of opening holes 122a which are each formed into a cylindrical shape about the axial line X1 and have a diameter smaller than the outer diameter of spherical lock balls 121. As shown in FIG. 5, the lock balls 121 are respectively accommodated in the opening holes 122a of the socket member 122. The outer diameter of each of the lock balls 121 is larger than the diameter of each of the opening holes 122a, which prevents the lock balls 121 from being completely disengaged from the opening holes 122a into the inner peripheral side of the socket member 122.

Although FIG. 5 illustrate only two lock balls 121, the ball lock mechanism 120 includes a plurality of lock balls 121 at regular intervals (for example, 12 lock balls at an interval of 30°) in the circumferential direction about the axial line X1. Similarly, the ball lock mechanism 120 includes a plurality of opening holes 122a at regular intervals (for example, 12 opening holes at an interval of 30°) in the circumferential direction about the axial line X1.

The sleeve 123 is a member that is formed into a cylindrical shape about the axial line X1 and is disposed at the outer peripheral side of the socket member 122. The upper end position of the sleeve 123 is regulated by the socket member 122, and the lower end position thereof is regulated by the annular stop ring 125 which is attached to the outer peripheral surface at the lower end side of the socket member 122. The sleeve 123 is movable relatively to the socket member 122 between the upper end position and the lower end position along the axial line X1.

The sleeve 123 includes a regulating portion 123a that regulates the plurality of lock balls 121 respectively accommodated in the opening holes 122a to be in a state where the lock balls 121 are engaged with the engagement groove 310 of the key ring 300.

The spring 124 is an elastic member having an upper end (one end) that is formed along the axial line X1 and fixed to the socket member 122, and having a lower end (the other end) that is formed along the axial line X1 and fixed to the sleeve 123 via the spring receiving member 126. The spring 124 generates an urging force by elastic deformation, and urges the sleeve 123 against the lower end position where the regulating portion 123a of the sleeve 123 contacts the lock balls 121. The springs 124 are arranged at a plurality of sections at regular intervals (for example, six sections at an interval of 60°) in the circumferential direction about the axial line X1. The arrangement of the springs 124 at the plurality of sections at regular intervals makes it possible to supply the sleeve 123 with a uniform urging force.

In this case, the spring receiving member 126 is a member that is formed with an annular shape about the axial line X1, and has opening holes for accommodating the springs 124 that are formed at a plurality of sections.

While the springs 124 are provided at the plurality of sections at regular intervals in the circumferential direction about the axial line X1 in this embodiment, a single spring having the same diameter as that of the spring receiving member 126 may be provided about the axial line X1.

As shown in FIGS. 2 and 3, the rotary valve 130 is a member formed into a columnar shape along the axial line X2 which is perpendicular to the axial line X1. The rotary valve 130 includes an outflow through-hole 131 which is formed at a position where the second liquid outflow passage 111 on the axial line X2 is disposed, and an inflow through-hole 132 which is formed at a position where the second liquid inflow passage 112 on the axial line X2 is disposed. The rotary valve 130 is inserted into the insert hole 114, which is formed in the socket body 110, so as to be rotatable about the axial line X2.

The switching mechanism 140 is a mechanism that is coupled to the rotary valve 130 and causes the rotary valve 130 to be rotated about the axial line X2, thereby switching the rotary valve 130 to one of an open state and a closed state.

As shown in FIG. 3, the open state of the rotary valve 130 is a state in which the outflow through-hole 131 formed in the rotary valve 130 communicates with the second liquid outflow passage 111 of the socket body 110 and the inflow through-hole 132 formed in the rotary valve 130 communicates with the second liquid inflow passage 112 of the socket body 110.

As shown in FIG. 2, the closed state of the rotary valve 130 is a state in which the outflow through-hole 131 formed in the rotary valve 130 does not communicate with the second liquid outflow passage 111 of the socket body 110 and the inflow through-hole 132 formed in the rotary valve 130 does not communicate with the second liquid inflow passage 112 of the socket body 110.

As shown in FIG. 3, in an open state, the first liquid outflow passage 211 and the second liquid outflow passage 111 communicate with each other and the first liquid inflow passage 212 and the second liquid inflow passage 112 communicate with each other.

In the closed state, the first liquid outflow passage 211 and the second liquid outflow passage 111 do not communicate with each other and the first liquid inflow passage 212 and the second liquid inflow passage 112 do not communicate with each other.

The switching mechanism 140 includes a pair of opening/closing arms (regulating member) 141 that are coupled to both ends of the rotary valve 130 and accept an opening/closing operation by an operator.

The operator causes the plug 200 to be fixed to the inner peripheral surface of the opening 510 to attach the socket 100 to the key ring 300, and then grips the opening/closing arms 141 to be rotated about the axial line X2. As a result, the rotary valve 130 is switched from the closed state shown in FIG. 2 to the open state shown in FIG. 3.

Referring now to FIGS. 6 to 9, the structure of the opening/closing arm 141 for regulating releasing of the fixation of the socket body 110 to the key ring 300 in the open state by the ball lock mechanism 120 will be described.

Figure 6:
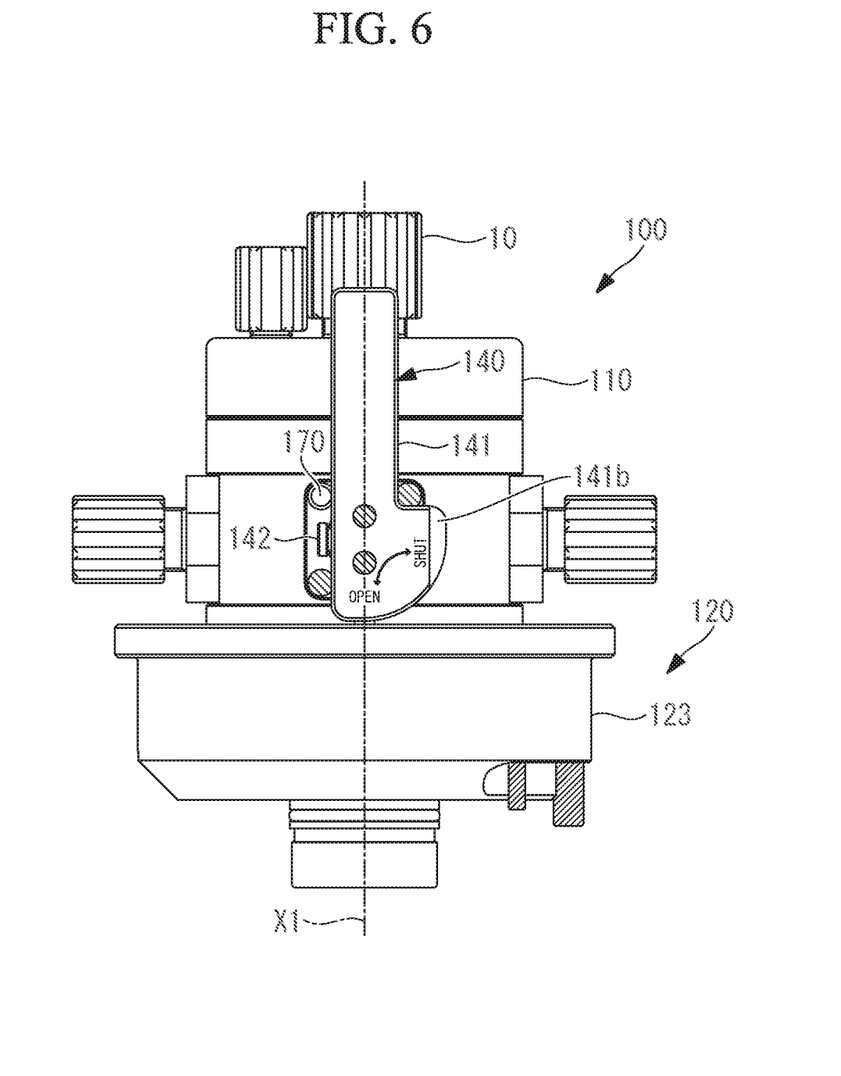
FIG. 6 is a left side view of the socket in an open state shown in FIG. 3.
Figure 7:
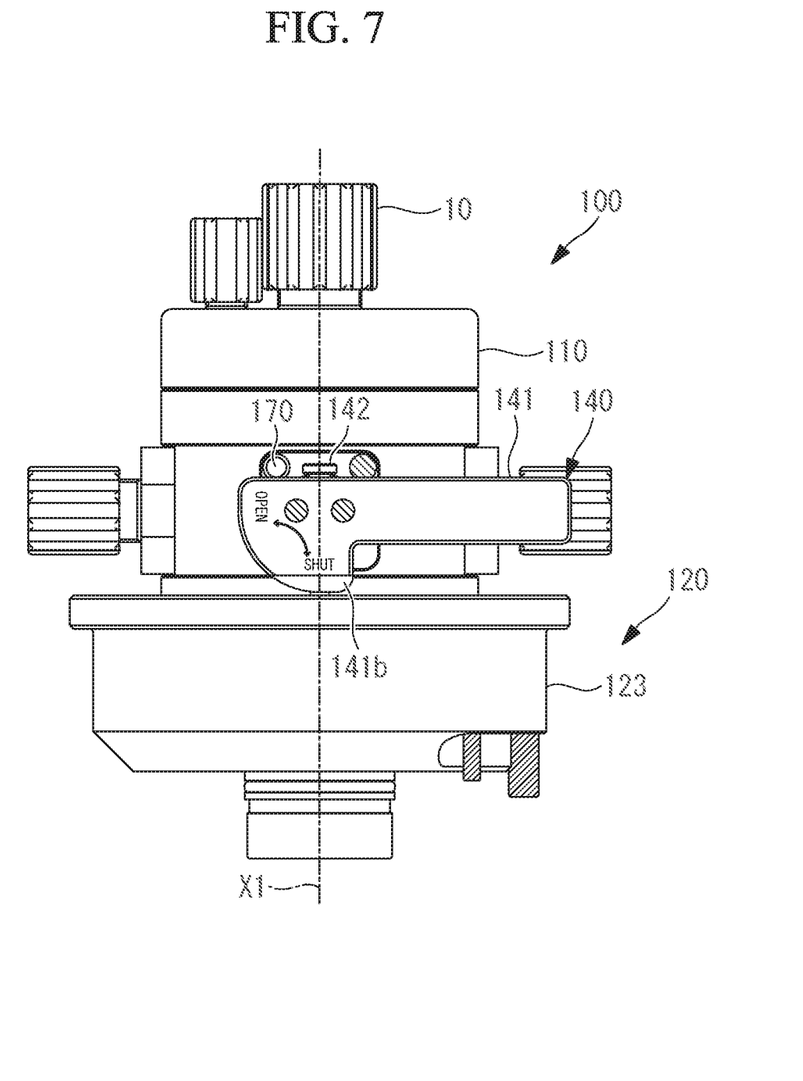
FIG. 7 is a left side view of the socket in a closed state.
Figure 8:
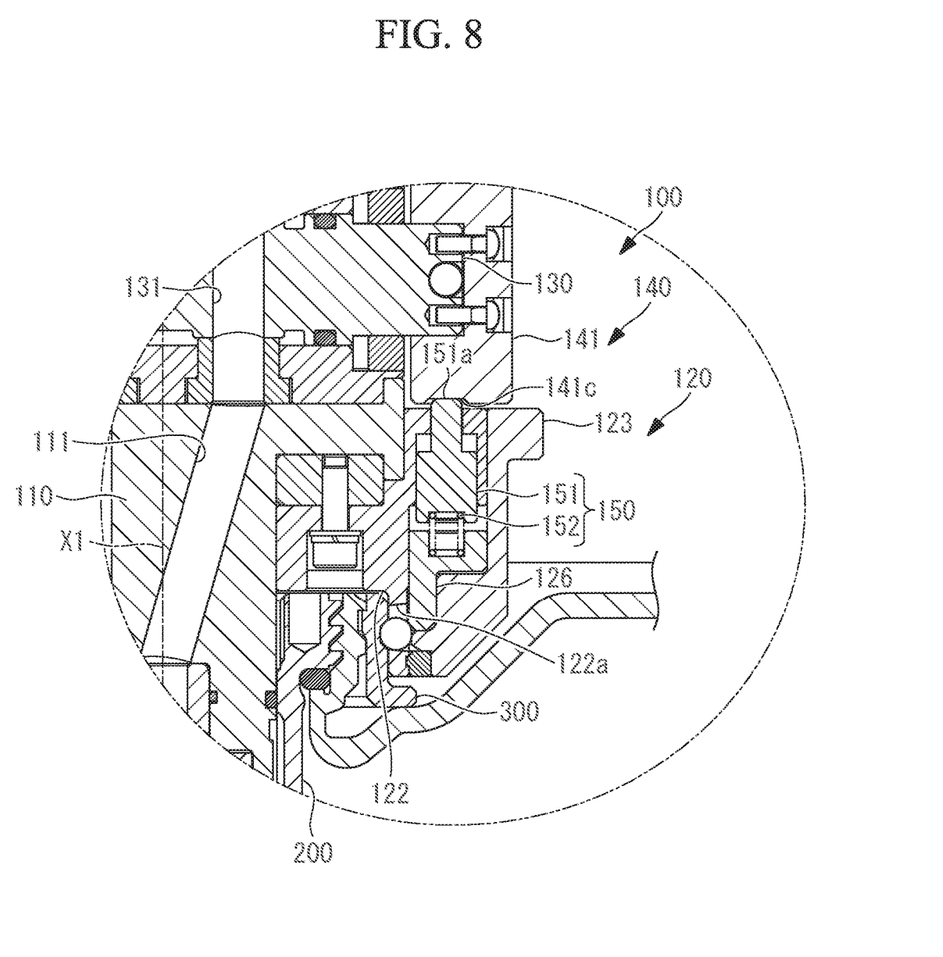
FIG. 8 is a partial enlarged view of a portion "I" shown in FIG. 3.
Figure 9:
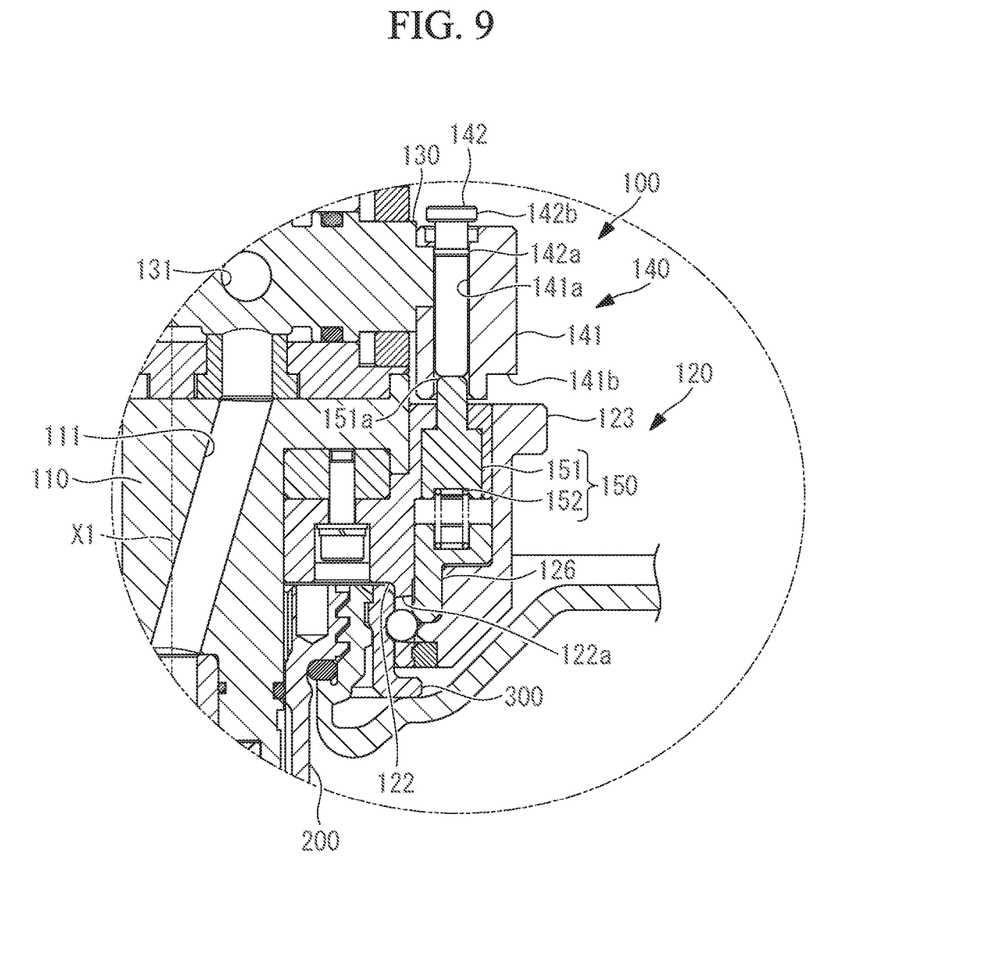
FIG. 9 is a partial enlarged view of the portion "I" shown in FIG. 3.

FIG. 6 is a left side view of the socket 100 in the open state shown in FIG. 3. FIG. 7 is a left side view of the socket 100 in the closed state. FIG. 8 is a partial enlarged view of a portion "I" shown in FIG. 3 and illustrates the open sate of the switching mechanism 140. FIG. 9 is a partial enlarged view of the portion "I" shown in FIG. 3 and illustrates the closed state of the switching mechanism 140.

As shown in FIG. 6, in the open state of the rotary valve 130, a step portion 141b of the opening/closing arm 141 is disposed at a position that is not opposed to the upper surface of the sleeve 123. Accordingly, the opening/closing arm 141 regulates the movement of the sleeve 123 toward the switching mechanism 140 along the axial line X1 in the open state. Further, the opening/closing arm 141 regulates the movement of the sleeve 123 in the open state, thereby regulating releasing of the fixation of the socket body 110 to the key ring 300 by the ball lock mechanism 120 in the open state.

On the other hand, as shown in FIGS. 7 and 9, in the closed state of the rotary valve 130, the step portion 141b of the opening/closing arm 141 is disposed at a position opposing the upper surface of the sleeve 123. Accordingly, the opening/closing arm 141 allows the sleeve 123 to be moved toward the switching mechanism 140 along the axial line X1 in the closed state. Further, the opening/closing arm 141 allows the sleeve 123 to be moved in the closed state, thereby allowing the fixation of the socket body 110 to the key ring 300 by the ball lock mechanism 120 to be released in the closed state.

A stop pin 170 shown in FIGS. 6 and 7 will now be described.

The stop pin 170 is a shaft-like member that is provided to prevent a failure that the operator excessively rotates the opening/closing arm 141 of the switching mechanism 140.

In the open state of the rotary valve 130 shown in FIG. 6, the stop pin 170 comes into contact with the opening/closing arm 141 at a position shown in FIG. 6, thereby regulating the opening/closing arm 141 from being further rotated counterclockwise.

In the closed state of the rotary valve 130 shown in FIG. 7, the stop pin 170 comes into contact with the opening/closing arm 141 at a position shown in FIG. 7, thereby regulating the opening/closing arm 141 from being further rotated clockwise.

Thus, the stop pin 170 prevents a failure that the operator excessively rotates the opening/closing arm 141 of the switching mechanism 140. Further, the stop pin 170 prevents a failure that the pin member 151 is damaged due to the excessive rotation of the opening/closing arm 141.

Next, a regulating mechanism 150 that regulates switching from the closed state to the open state by the switching mechanism 140 will be described. The regulating mechanism 150 is a mechanism for preventing a failure that the liquid flows to the outside from the connector 400 when the rotary valve 130 is switched from the closed state to the open state by an unintended operation or the like of the operator.

As shown in FIG. 9, the regulating mechanism 150 includes a pin member (shaft-like member) 151 which extends along the axial line X1, and a spring (urging member) 152 which urges the pin member 151 against the switching mechanism 140. A leading end 151a of the pin member 151 is accommodated in a through-hole (accommodation hole) 141a, which is formed in the opening/closing arm 141, when the rotary valve 130 is in the closed state. The through-hole 141a accommodates the leading end 151a of the pin member 151, thereby regulating the rotation of the rotary valve 130 when the rotary valve 130 is in the closed state.

The regulating mechanism 150 regulates the rotation of the rotary valve 130 when the rotary valve 130 is in the closed state, but does not regulate the rotation of the rotary valve 130 when the rotary valve 130 is in the open state. As shown in FIG. 8. When the rotary valve 130 is in the open state, only a portion of the leading end 151a of the pin member 151 is accommodated in a concave portion 141c which is formed in the opening/closing arm 141. Since the depth of the concave portion 141c along the axial line X1 is sufficiently small, the rotation of the rotary valve 130 is not regulated.

The operator operates the switching mechanism 140 and can recognize that the rotary valve 130 is brought into the open state, by a vibration or sound generated when the leading end 151a of the pin member 151 is accommodated in the concave portion 141c.

Next, a push rod (releasing mechanism) 142 that accepts an operation by the operator who operates the connector 400 and releases the regulated state in which the rotation of the rotary valve 130 is regulated.

As shown in FIG. 9, the push rod 142 is a shaft-like member extending along the axial line X1 and is accommodated in the through-hole 141a. An enlarged diameter portion 142a having an outer diameter larger than the inner diameter at an upper end of the through-hole 141a is formed in the vicinity of an upper end of the push rod 142.

Accordingly, in a state where the operator does not perform any operation on the push rod 142, the urging force of the spring 152 is transmitted to the push rod 142 via the pin member 151 and the enlarged diameter portion 142a is brought into contact with the upper end of the through-hole 141a.

Figure 10:
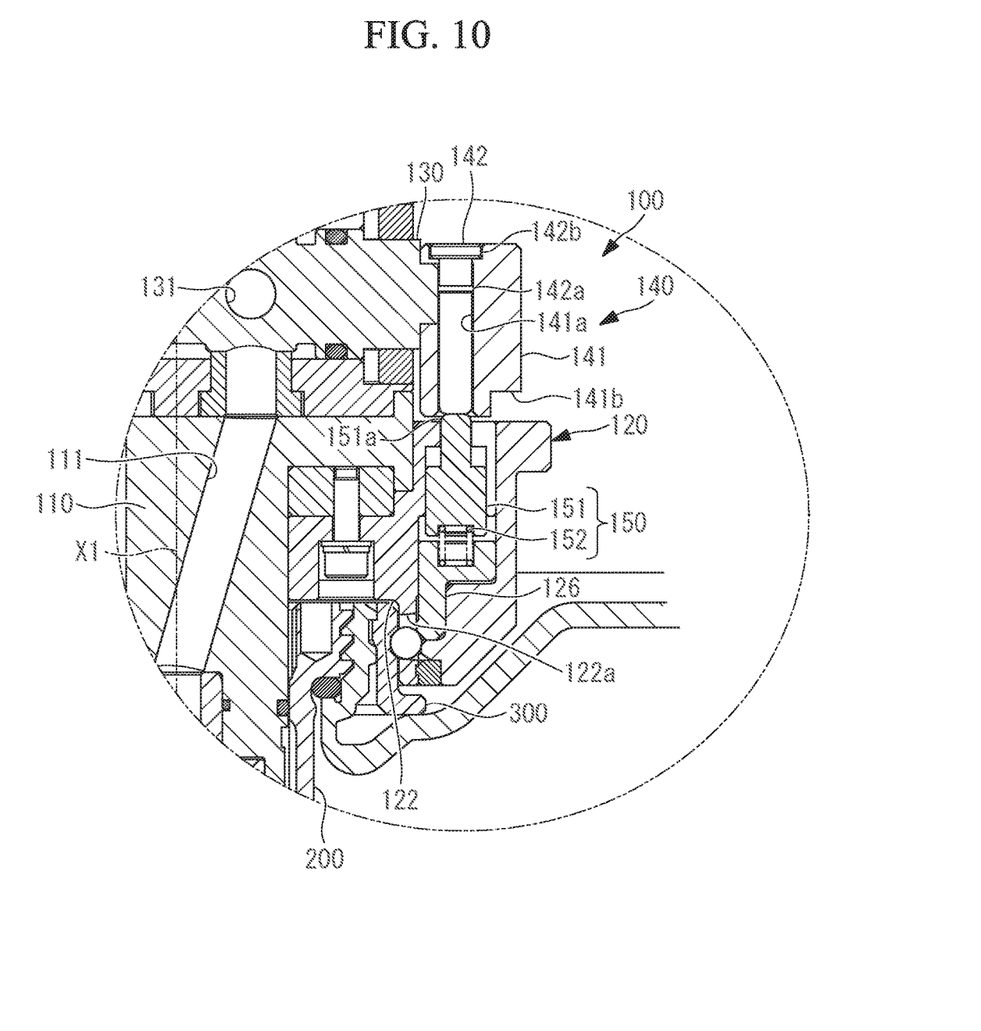
FIG. 10 is a partial enlarged view of the portion "I" shown in FIG. 3.

When the regulated state in which the rotation of the rotary valve 130 is regulated is released, the operator who operates the connector 400 performs an operation for depressing the head portion 142b of the push rod 142 downward. The push rod 142 urges the pin member 151 in the downward direction opposing the urging force generated by the spring 152, so that the pin member 151 moves downward. Further, as shown in FIG. 10, the leading end 151a of the pin member 151 is not accommodated in the through-hole 141a. As a result, the regulated state in which the rotation of the rotary valve 130 is regulated is released. The operator rotates the opening/closing arm 141 about the axial line X2 in a state where the head portion 142b of the push rod 142 is depressed downward, thereby allowing the rotary valve 130 to be switched from the closed state to the open state.

Other Embodiments

In the above description, the key ring 300 is fixed to the opening 510 of the liquid storing container 500 and the ball lock mechanism 120 of the socket 100 is engaged with the engagement groove 310 of the key ring 300. In other words, a structure in which the key ring 300 is fixed to the opening 510 of the liquid storing container 500 is used as an opening of the liquid storing container 500 and the socket 100 is fixed to the opening. However, the present invention may have another aspect.

For example, the ball lock mechanism 120 of the socket 100 may be directly engaged with the engagement groove 511 of the opening 510, instead of fixing the key ring 300 to the opening 510 of the liquid storing container 500.

The invention claimed is:

1. A connector to be attached to an opening of a liquid storing container, the connector comprising:
   a plug to be attached to the opening; and
   a socket to be detachably attached to the plug, wherein the plug includes:
      a plug body in which a first liquid outflow passage through which a liquid contained in the liquid storing container is drawn out and a first liquid inflow passage for guiding the liquid flowing in from an outside of the liquid storing container into the liquid storing container are formed,
   the socket includes:
      a socket body in which a second liquid outflow passage through which the liquid drawn out from the first liquid outflow passage flows to the outside and a second liquid inflow passage for guiding the liquid flowing in from the outside of the liquid storing container to the first liquid inflow passage are formed;

a lock mechanism that is attached to the socket body and fixes the socket body to the opening; and a switching mechanism that switches an open state and a closed state, the open state being a state in which the first liquid outflow passage and the second liquid outflow passage communicate with each other and the first liquid inflow passage and the second liquid inflow passage communicate with each other, and the closed state being a state in which the first liquid outflow passage and the second liquid outflow passage do not communicate with each other and the first liquid inflow passage and the second liquid inflow passage do not communicate with each other, and the switching mechanism includes a regulating member that regulates releasing of the fixation of the socket body to the opening by the lock mechanism in the open state.

2. The connector according to claim 1, wherein the socket includes a regulating mechanism that regulates switching from the closed state to the open state by the switching mechanism.

3. The connector according to claim 2, wherein the switching mechanism includes a releasing mechanism that accepts an operation by an operator and releases a regulated state in which switching from the closed state to the open state by the regulating mechanism is regulated.

4. The connector according to claim 3, wherein the opening is formed into a cylindrical shape about a first axial line, the socket body has a cylindrical insertion hole formed along a second axial line intersecting with the first axial line so as to penetrate through each of the second liquid outflow passage and the second liquid inflow passage, the socket includes a columnar rotary valve including an outflow through-hole formed at a position where the second liquid outflow passage is disposed on the second axial line and an inflow through-hole formed at a position where the second liquid inflow passage is disposed on the second axial line, the rotary valve being inserted into the insertion hole, the regulating mechanism includes a shaft-like member extending along the first axial line, and an urging member that urges the shaft-like member against the switching mechanism, the switching mechanism switches the open state and the closed state by rotating the rotary valve about the second axial line and includes an accommodation hole that accommodates the shaft member and regulates the rotation of the rotary valve in the closed state, and the releasing mechanism releases the regulated state by urging the shaft-like member accommodated in the accommodation hole in a direction opposing an urging force generated by the urging member.

5. The connector according to claim 4, wherein the switching mechanism includes a concave portion that accommodates a leading end of the shaft-like member without regulating the rotation of the rotary valve in the open state.

6. The connector according to claim 1, wherein the opening is formed into a cylindrical shape about a first axial line and an engagement groove is formed in an outer peripheral surface along a circumferential direction about the first axial line, and the lock mechanism includes:

a plurality of lock balls to be engaged with the engagement groove;

a first cylindrical member formed into a cylindrical shape about the first axial line and including a plurality of opening holes having a diameter smaller than an outer diameter of each of the lock balls;

a second cylindrical member formed into a cylindrical shape about the first axial line and including a regulating portion that is disposed on an outer periphery of the first cylindrical member, the regulating portion being configured to regulate the lock balls accommodated in the opening holes to be in a state where the lock balls are engaged with the engagement groove; and an urging force generation portion having one end along the first axial line that is fixed to the first cylindrical member, and having another end along the first axial line that is fixed to the second cylindrical member, the urging force generation portion being configured to urge the second cylindrical member against a position where the regulating portion is in contact with the lock balls.

7. A socket to be detachably attached to a plug to be attached to an opening of a liquid storing container, the plug including a plug body in which a first liquid outflow passage through which a liquid contained in the liquid storing container is drawn out and a first liquid inflow passage for guiding the liquid flowing in from an outside of the liquid storing container into the liquid storing container are formed, the socket comprising:

a socket body in which a second liquid outflow passage through which the liquid is drawn out from the first liquid outflow passage flows to the outside and a second liquid inflow passage for guiding the liquid flowing in from the outside of the liquid storing container into the first liquid inflow passage are formed;

a lock mechanism that is attached to the socket body and fixes the socket body to the opening; and a switching mechanism that switches an open state and a closed state, the open state being a state in which the first liquid outflow passage and the second liquid outflow passage communicate with each other and the first liquid inflow passage and the second liquid inflow passage communicate with each other, and the closed state being a state in which the first liquid outflow passage and the second liquid outflow passage do not communicate with each other and the first liquid inflow passage and the second liquid inflow passage do not communicate with each other, wherein the switching mechanism includes a regulating member that regulates releasing of the fixation of the socket body to the opening by the lock mechanism in the open state.

* * * * *